US007855169B2

(12) United States Patent
Pope et al.

(10) Patent No.: US 7,855,169 B2
(45) Date of Patent: Dec. 21, 2010

(54) USE OF FLUOROCARBON SURFACTANTS TO IMPROVE THE PRODUCTIVITY OF GAS AND GAS CONDENSATE WELLS

(75) Inventors: Gary A. Pope, Cedar Park, TX (US); Mukul M. Sharma, Austin, TX (US); Viren Kumar, Bangalore (IN); Jimmie R. Baran, Jr., Prescott, WI (US)

(73) Assignees: Board of Regents, The University of Texas System, Austin, TX (US); 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/827,290

(22) Filed: Jun. 30, 2010

(65) Prior Publication Data

US 2010/0292110 A1 Nov. 18, 2010

Related U.S. Application Data

(63) Continuation of application No. 12/185,571, filed on Aug. 4, 2008, now Pat. No. 7,772,162, which is a continuation-in-part of application No. 11/390,960, filed on Mar. 27, 2006, now abandoned.

(51) Int. Cl.
C09K 8/60 (2006.01)
E21B 43/16 (2006.01)

(52) U.S. Cl. ............ 507/205; 166/305.1; 166/308.1; 166/308.4; 507/224; 507/910; 507/922

(58) Field of Classification Search .......... 507/205, 507/224, 910, 922; 166/305.1, 308.1, 308.4
See application file for complete search history.

(56) References Cited

U.S. PATENT DOCUMENTS

| | | | |
|---|---|---|---|
| 2,732,398 A | 1/1956 | Brice et al. | |
| 2,803,615 A | 8/1957 | Ahlbrecht et al. | |
| 3,554,288 A | 1/1971 | Ross | |
| 3,653,442 A | 4/1972 | Ross | |
| 3,787,351 A | 1/1974 | Olson | |
| 3,902,557 A | 9/1975 | Shaughnessy et al. | |
| 4,018,689 A | 4/1977 | Thompson | |
| 4,329,236 A | 5/1982 | Alford et al. | |
| 4,432,882 A | 2/1984 | Raynolds et al. | |
| 4,440,653 A | 4/1984 | Briscoe et al. | |
| 4,460,791 A | 7/1984 | Cooke | |
| 4,557,837 A | 12/1985 | Ckark, III et al. | |
| 4,565,639 A | 1/1986 | Penny et al. | |
| 4,609,043 A | 9/1986 | Cullick | |
| 4,702,849 A | 10/1987 | Penny | |
| 4,767,545 A | 8/1988 | Karydas et al. | |
| 4,823,873 A | 4/1989 | Karydas | |
| 4,921,619 A | 5/1990 | Karydas | |
| 4,923,009 A | 5/1990 | Watkins | |
| 4,975,468 A | 12/1990 | Yiv | |
| 4,993,448 A | 2/1991 | Karydas et al. | |
| 4,997,580 A | 3/1991 | Karydas et al. | |
| 5,042,580 A | 8/1991 | Cullick et al. | |
| 5,143,958 A | 9/1992 | Lockhart et al. | |
| 5,181,568 A | 1/1993 | McKown et al. | |
| 5,186,257 A | 2/1993 | Stahl et al. | |
| 5,219,476 A | 6/1993 | Lockhart et al. | |
| 5,247,993 A | 9/1993 | Sarem et al. | |
| 5,310,882 A | 5/1994 | Blauch et al. | |
| 5,338,465 A | 8/1994 | Lockhart et al. | |
| 5,358,052 A | 10/1994 | Gidley | |
| 5,415,229 A | 5/1995 | Sydansk | |
| 5,733,526 A | 3/1998 | Trevino et al. | |
| 5,965,659 A | 10/1999 | Kubo et al. | |
| 6,113,919 A | 9/2000 | Reiss et al. | |
| 6,127,430 A | 10/2000 | Baran, Jr. et al. | |
| 6,206,102 B1 | 3/2001 | Pusch et al. | |
| 6,225,263 B1 | 5/2001 | Collins et al. | |
| 6,274,060 B1 | 8/2001 | Sakashita et al. | |
| 6,443,230 B1 | 9/2002 | Boles et al. | |
| 6,579,572 B2 | 6/2003 | Espin et al. | |
| 6,660,693 B2 | 12/2003 | Miller et al. | |
| 6,664,354 B2 | 12/2003 | Savu et al. | |
| 6,689,854 B2 | 2/2004 | Fan et al. | |
| 6,729,409 B1 | 5/2004 | Gupta et al. | |
| 6,790,870 B1 * | 9/2004 | DeSimone et al. | ............ 521/79 |
| 6,805,198 B2 | 10/2004 | Huang et al. | |
| 6,852,781 B2 | 2/2005 | Savu et al. | |
| 6,911,417 B2 | 6/2005 | Chan et al. | |
| 6,945,327 B2 | 9/2005 | Ely et al. | |
| 6,972,274 B1 | 12/2005 | Slikta et al. | |
| 7,199,197 B2 | 4/2007 | Caldwell et al. | |
| 7,585,817 B2 * | 9/2009 | Pope et al. | ................ 507/205 |
| 7,772,162 B2 * | 8/2010 | Pope et al. | ................ 507/205 |
| 2001/0016562 A1 | 8/2001 | Muir et al. | |
| 2003/0083448 A1 | 5/2003 | Fan et al. | |
| 2003/0092581 A1 | 5/2003 | Crews | |

(Continued)

FOREIGN PATENT DOCUMENTS

| | | |
|---|---|---|
| CA | 2009732 | 8/1990 |
| JP | 3-219248 | 9/1991 |
| JP | 7-101803 | 4/1995 |
| JP | 8-193021 | 7/1996 |
| WO | 2005/028589 A1 | 3/2005 |
| WO | 2005/035936 A1 | 4/2005 |
| WO | 2006/028608 A1 | 3/2006 |
| WO | 2007097975 A2 | 8/2007 |

OTHER PUBLICATIONS

International Search Report and Written Opinion for PCT/US2007/076562 dated Sep. 29, 2008.

(Continued)

Primary Examiner—Timothy J. Kugel
(74) Attorney, Agent, or Firm—Chalker Flores, LLP; Edwin S. Flores; Daniel J. Chalker

(57) ABSTRACT

The present invention includes composition having a nonionic, fluorinated polymeric surfactant, water and solvent. Embodiments of compositions according to the present invention are useful, for example, for recovering hydrocarbons from subterranean clastic formations.

20 Claims, 10 Drawing Sheets

U.S. PATENT DOCUMENTS

| | | |
|---|---|---|
| 2004/0186254 A1 | 9/2004 | Fan et al. |
| 2005/0142563 A1 | 6/2005 | Haddad et al. |
| 2005/0148491 A1 | 7/2005 | Savu et al. |
| 2005/0245401 A1 | 11/2005 | Chan et al. |
| 2006/0052499 A1 | 3/2006 | Gillig et al. |
| 2007/0029085 A1 | 2/2007 | Panga et al. |
| 2007/0225176 A1 | 9/2007 | Pope et al. |

OTHER PUBLICATIONS

U.S. Department of Energy, "Comments on the Outlook for Balancing Natural Gas Supply and Demand, EPAct Section 1818: Natural Gas Shortage Report," http://www.fossil.energy.gov/epact/Section_1818/comments.html, accessed Mar. 16, 2008.

Adibhatla, B., et al., "Effect of surfactants on wettability of near-wellbore regions of gas reservoirs," J Petr Sci Engr (2006), 52:227-236.

Al-An et al., "Laboratory Measurements of Condensate Blocking and Treatment for Both Low and High Permeability Rocks", 2002, SPE 7546, Society of Petroleum Engineers Inc., pp. 1-9.

Al-Anazi et al., "A Successful Methanol Treatment in a Gas-Condensate Reservoir: Field Application", Mar. 2003, SPE 80901, Society of Petroleum Engineers Inc., pp. 1-9.

Al-Anazi, "Experimental Measurements of Condensate Blocking and Treatments in Low and High Permeability Cores" (Thesis), Dec. 2003, pp. 1-474.

Ayyalasomayajula et al., "Phase Behavior Modeling of Hydrocarbon-Methanol-Water Mixtures by Peng-Robinson and SAFT Equations of State", Sep. 2002, SPE 77575, Society of Petroleum Engineers Inc., pp. 1-8.

Ayyalasomayajula, "Prediction of Bulk and Interfacial Thermodynamic Properties of Polar Mixtures by Statistical Associating Fluid Theory" (Thesis), May 2003, pp. 1-268.

Bang, "Phase Behavior Study of Hydrocarbon-Water-Alcohol Mixtures" (Thesis) May 2005, pp. 1-138.

Chowdhury, "Reservoir Simulation of Asphaltene Precipitation and of Gas Condensates" (Thesis), Dec. 2003, pp. 1-227.

Chowdhury et al., "A Semi-Analytical Method to Predict Well Deliverability in Gas-Condensate Reservoirs", Sep. 2004, SPE 90320, Society of Petroleum Engineers Inc., pp. 1-13.

Crema et al., "Foaming of Anhydrous Methanol for Well Stimulation", Apr. 1985, SPE 13565, Society of Petroleum Engineers Inc., 4 pages.

Du et al., "Use of Solvents to Improve the Productivity of gas Condensate Wells", Oct. 2000, SPE 62935, Society of Petroleum Engineers Inc., pp. 1-8.

Fahes et al., "Wettability Alteration to Intermediate Gas-Wetting in Gas-Condensate Reservoirs at High Temperatures", Oct. 2005, SPE 96184, Society of Petroleum Engineers Inc., pp. 1-14.

Gadde et al., "Modeling Proppant Settling in Water-Fracs", Sep. 2004, SPE 89875, Society of Petroleum Engineers Inc., pp. 1-10.

Kumar, "A Simulation Study of Carbon Sequestration in Deep Saline Aquifers" (Thesis), Aug. 2004, pp. 1-192.

Lee, "Phase Equilibria in Systems Containing Hydrocarbon, Water and Methanol" (Thesis), May 2003, pp. 1-92.

Li, K., et al., "Experimental Study of Wettability Alteration to Preferential Gass-Wetting in Porous Media and Its Effects," SPE Reservoir Eval and Eng (2000), 3:139-149.

Mahadevan et al., "Clean-up of Water Blocks in Low Permeability Formations", Oct. 2003, SPE 84216, Society of Petroleum Engineers Inc., pp. 1-8.

Mahadevan et al., "Evaporative Clean-up of Water-Blocks in Gas Wells", Apr. 2005, SPE 94215, Society of Petroleum Engineers Inc., pp. 1-11.

Narayanaswamy et al., "Effect of Heterogeneity on the Non-Darcy Flow Coefficient", Mar. 1998, SPE 39979, Society of Petroleum Engineers Inc., pp. 1-17.

Nasr-El-Din et al., "Surface tension of HCl-based stimulation fluids at high temperatures", Jun. 2004, Journal of Petroleum Science and Engineering, vol. 43(1-2), pp. 57-73.

Ortiz et al., "Low-pH methanol: an alternative for stimulation in water-sensitive, tight, dirty sandstones", 1986, SPE Production Engineering (0885-9221), vol. 1(3). pp. 195-202.

Parekh et al., "Cleanup of Water Blocks in Depleted Low-Permeability Reservoirs", Sep. 2004, SPE 89837, Society of Petroleum Engineers Inc., pp. 1-12.

Pope et al., "Modeling Relative Permeability Effects in Gas-Condensate Reservoirs using a New Trapping Model", Sep. 1998, SPE 49266, Society of Petroleum Engineers Inc., pp. 1-8.

Product Information: 3M™ Novec Fluorosurfactant FC-4430, Oct. 2005, 6 pages.

Product Information: 3M™ Novec Fluorosurfactant FC 4432, Oct. 2005, 6 pages.

Product Information: 3M™ Novec Fluorosurfactant FC 4434, Jan. 2005, 4 pages.

Rai, "Parametric Study of Relative Permeability Effects on Gas-Condensate core Floods and Wells" (Thesis), Dec. 2003, pp. 1-319.

Sharma, "Modeling Gas Condensate Reservoirs and Development of a New Hybrid Well Model" (Thesis), May 2003, pp. 1-231.

Sharma et al., "Slick Water and Hybrid Fracs in the Bossier: Some Lessons Learnt", Sep. 2004, SPE 89876, of Petroleum Engineers Inc., pp. 1-12.

Tang, G-Q., et al., "Relative Permeability Modification in Gas-Liquid Systems Through Wettability Alteration to Intermediate Gas-Wetting," Oct. 2000, SPE 62934, Society of Petroleum Engineers Inc., pp. 1-15.

Wu et al., "Modeling Non-Equilibrium Mass Transfer Effects for a Gas Condensate Field", Mar. 1998, SPE 39764, Society for Petroleum Engineers Inc., pp. 1-16.

* cited by examiner

USE OF FLUOROCARBON SURFACTANTS TO IMPROVE THE PRODUCTIVITY OF GAS AND GAS CONDENSATE WELLS

CROSS REFERENCE TO RELATED APPLICATIONS

This application is a continuation of U.S. application Ser. No. 12/185,571, filed Aug. 4, 2008, now U.S. Pat. No. 7,772,162, which is a continuation-in-part of U.S. application Ser. No. 11/390,960, filed Mar. 27, 2006, now abandoned, the disclosures of which are incorporated herein by reference in their entirety.

BACKGROUND

It is known in the subterranean well drilling art that in some gas wells, liquid hydrocarbons (condensate) can form and accumulate in the vicinity of the well. In such reservoirs (sometimes referred to as retrograde condensate reservoirs), the presence of condensate can cause a large decrease in both the gas and condensate relative permeabilities, and thus the productivity of the well decreases. In some instances, the liquid blocking the flow of gas may be both condensate and water. The water may be from the subterranean formation or from operations conducted on the well.

One solution known in the art to address the formation of the condensate is to perform a formation fracturing and propping operation (e.g., prior to, or simultaneously with, a gravel packing operation) to increase the permeability of the production zone adjacent to the wellbore. For example, a fracture fluid such as water, oil, oil/water emulsion, gelled water or gelled oil is pumped down the work string with sufficient volume and pressure to open one or more fractures in the production zone of the formation. Optionally, the fracture fluid may carry a proppant, into the fractures to hold the fractures open following the fracturing operation. Proppants provide an efficient conduit for production of fluid from the reservoir to the wellbore, and may be naturally occurring sand grains, man-made or specially engineered (e.g., resin-coated sand), or high-strength ceramic materials (e.g., sintered bauxite).

The fracture fluid is forced into the formation at a flow rate great enough to fracture the formation allowing the entrained proppant to enter the fractures and prop the formation structures apart, producing channels that create highly conductive paths reaching out into the production zone, and thereby increasing the reservoir permeability in the fracture region. Although not wanting to be bound by theory, it is believed that the effectiveness of the fracture operation is dependent upon the ability to inject large volumes of hydraulic fracture fluid along the entire length of the formation at a high pressure and at a high flow rate.

Injection of methanol into condensate-blocked wells has been used to remove both water and condensate, and restore gas productivity for a period of time that may last up to several months. Again, not wanting to be bound by theory, it is believed that methanol provides an enhanced flow period by delaying the condensate bank formation and in some instances by removing the water from the near well region.

Despite advances in addressing the formation of the condensate, there is a continuing desire for alternative and/or improved techniques for addressing the condensate and/or water blocking issue.

SUMMARY

Compositions and methods according to the present invention are useful, for example, for increasing production of methane and/or gas-condensate (typically containing at least one of methane, ethane, propane, butane, hexane, heptane, or octane) from hydrocarbon-bearing clastic formations (in some embodiments, predominantly sandstone).

In one aspect, the present invention provides a composition including nonionic fluorinated polymeric surfactant, water, and at least 50 percent by weight solvent, based on the total weight of the composition, wherein the nonionic fluorinated polymeric surfactant includes:

(a) at least one divalent unit represented by the formula:

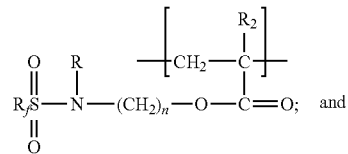

(b) a poly(alkyleneoxy) segment;
wherein
$R_f$ represents a perfluoroalkyl group having from 1 to 8 carbon atoms;
R and $R_2$ are each independently hydrogen or alkyl of 1 to 4 carbon atoms; and
n is an integer from 2 to 10.

In some embodiments, the nonionic fluorinated polymeric surfactant comprises at least one divalent unit represented by a formula selected from the group consisting of:

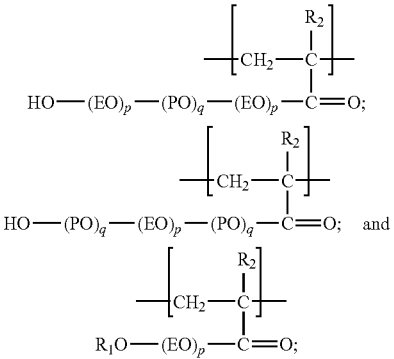

wherein
$R_1$ and $R_2$ are each independently hydrogen or alkyl of 1 to 4 carbon atoms;
EO represents —$CH_2CH_2O$—;
PO represents —$CH(CH_3)CH_2O$—;
each p is independently an integer of 1 to about 128; and
each q is independently an integer of 0 to about 55.

In some embodiments, $R_f$ has from 4 to 6 carbon atoms. In some embodiments, $R_f$ is perfluorobutyl. In some embodiments, the nonionic fluorinated polymeric surfactant is free of (i.e., has no) hydrolyzable silane groups.

The present invention also provides a composition including the nonionic fluorinated polymeric surfactant, a liquid vehicle including at least 50 weight percent water-miscible solvent, based on the total weight of the composition, and water, wherein the nonionic fluorinated polymeric surfactant has a solubility in the liquid vehicle that decreases with an increase in temperature.

In some embodiments, the nonionic fluorinated polymeric surfactant is preparable, for example, by copolymerization of:

(a) at least one compound represented by the formula

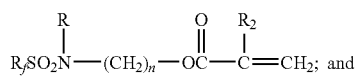

(b) at least one of a poly(alkyleneoxy) monoacrylate or diacrylate. In some of these embodiments, the poly(alkyleneoxy) monoacrylate comprises at least one compound represented by a formula selected from the group consisting of:

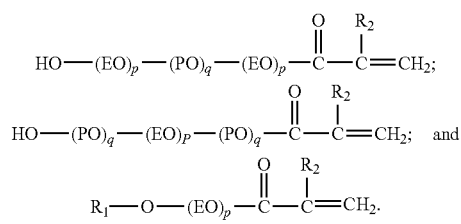

Generally, the amount of the nonionic fluorinated polymeric surfactant, water, and solvent (and type of solvent) is dependent on the particular application. In some embodiments, compositions described herein include at least 0.01 (in some embodiments, at least 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, 5, or even at least 10; in some embodiments in a range from 0.01 to 10, 0.1 to 10, 0.1 to 5, 1 to 10, or even in a range from 1 to 5) percent by weight of the nonionic fluorinated polymeric surfactant, based on the total weight of the composition. In some embodiments, compositions described herein include at least 0.1 (in some embodiments, at least 0.2, 0.25, 0.3, 0.4, 0.5, 1, 2, 3, 4, 5, 6, 7, 8, 9, 10, 15, 20, 25, 30, 35, 40, 45, or even at least 49.99; in some embodiments in a range from 0.1 to 49.99, 1 to 40, 1 to 25, 1 to 10, 1 to 4, or even in a range from 4 to 25) percent by weight water, based on the total weight of the composition. In some embodiments, compositions described herein include at least 51, 52, 53, 54, 55, 60, 65, 70, 75, 80, 85, 90, 95, or even at least 99.89 (in some embodiments, in a range from 50 to 99, 60 to 99, 70 to 99, 80 to 99, or even in a range from 90 to 99) percent by weight solvent, based on the total weight of the composition. In some embodiments, compositions described herein include about 2 percent by weight the nonionic fluorinated polymeric surfactant, about 4 percent by weight water, and about 94 percent by weight solvent (e.g., methanol), based on the total weight of the composition.

Embodiments of compositions described herein are useful, for example, for recovering hydrocarbons (e.g., at least one of methane, ethane, propane, butane, hexane, heptane, or octane) from hydrocarbon-bearing subterranean clastic formations (in some embodiments, predominantly sandstone). In some embodiments, compositions described herein are interactive with a subterranean clastic formation under downhole conditions (e.g., conditions including a pressure in a range from about 1 bar to 1000 bars (in some embodiments, in a range from about 10 bars to about 1000 bars, or even about 100 to about 1000 bars) and a temperature in a range from about 100° F. to 400° F. (in some embodiments, in a range from about 200° F. to about 300° F.; or even about 200° F. to 250° F.)). In some embodiments, compositions described herein are interactive with a hydrocarbon-bearing geological clastic formations (in some embodiments, predominantly sandstone (i.e., at least 50 percent by weight sandstone)).

In one embodiment, the present invention provides a method of treating a hydrocarbon-bearing subterranean clastic formation (in some embodiments, predominantly sandstone), wherein the method includes injecting a composition described herein into the hydrocarbon-bearing subterranean clastic formation. In some embodiments, the subterranean clastic formation is downhole.

In one embodiment, the present invention provides a method of stimulating hydrocarbon well productivity flow from a hydrocarbon-bearing subterranean clastic formation (in some embodiments, predominantly sandstone), wherein the method includes injecting a composition described herein into the subterranean clastic formation. In some embodiments, the subterranean clastic formation is downhole.

In one embodiment, the present invention provides a method of stimulating hydrocarbon flow from a hydrocarbon-bearing subterranean clastic formation (in some embodiments, predominantly sandstone), wherein the method includes injecting a composition described herein into the subterranean clastic formation and obtaining hydrocarbons therefrom. In some embodiments, the subterranean clastic formation is downhole.

In one embodiment, the present invention provides a method for recovering hydrocarbons from a hydrocarbon-bearing subterranean clastic formation (in some embodiments, predominantly sandstone), wherein the method includes injecting a composition described herein into the subterranean clastic formation and obtaining hydrocarbons therefrom. In some embodiments, the subterranean clastic formation is downhole.

Typically, the methods described herein include contacting the surface of the clastic formation with a composition described herein.

In one aspect, the present invention provides a gas-bearing clastic formation penetrated by a well bore comprising a region near the well bore treated with a nonionic polymeric surfactant, wherein the nonionic polymeric surfactant comprises:

(a) at least one divalent unit represented by the formula:

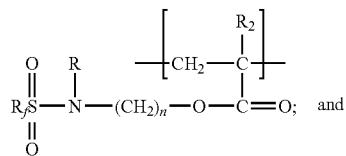

(b) a poly(alkyleneoxy) segment;
wherein
  $R_f$ represents a perfluoroalkyl group having from 1 to 8 carbon atoms;
  R and $R_2$ are each independently hydrogen or alkyl of 1 to 4 carbon atoms; and
  n is an integer from 2 to 10.

In some embodiments, the nonionic fluorinated polymeric surfactant comprises at least one divalent unit represented by a formula selected from the group consisting of:

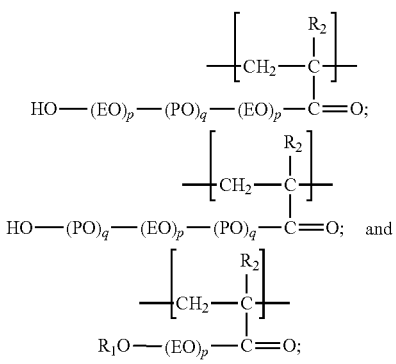

wherein
R₁ and R₂ are each independently hydrogen or alkyl of 1 to 4 carbon atoms;
EO represents —CH₂CH₂O—;
PO represents —CH(CH₃)CH₂O—;
each p is independently an integer of 1 to about 128; and
each q is independently an integer of 0 to about 55.

One advantage of embodiments of the present invention is that formulations of composition described herein can be customized for a particular application. For example, the present invention provides a method of making a composition described herein, wherein the method includes:

selecting a hydrocarbon-bearing subterranean clastic formation (in some embodiments, predominantly sandstone), the clastic formation having a temperature, water content, and ionic strength;

determining the temperature, water content, and ionic strength of the hydrocarbon-bearing subterranean clastic formation;

generating a formulation including a nonionic fluorinated polymeric surfactant (such as described above) and at least one of solvent or water, the formulation based at least in part on the determined temperature, water content, and ionic strength of the hydrocarbon-bearing subterranean clastic formation, wherein the nonionic fluorinated polymeric surfactant has a cloud point when placed in the hydrocarbon-bearing subterranean clastic formation that is above the temperature of the hydrocarbon-bearing subterranean clastic formation; and making a composition having the formulation.

Methods of using compositions described herein are useful, for example, on both existing and new wells. Typically, it is believed to be desirable to allow for a shut-in time after compositions described herein are contacted with the subterranean clastic formations. Exemplary set in times include a few hours (e.g., 1 to 12 hours), about 24 hours, or even a few (e.g., 2 to 10) days.

In one embodiment, the present invention provides a gaseous composition including methane and a thermal decomposition product of a nonionic fluorinated polymeric surfactant, wherein the thermal decomposition product includes a fluorinated organic compound. The present invention also provides a gaseous composition including methane and a product resulting from hydrolysis of a nonionic fluorinated polymeric surfactant, wherein the decomposition product includes a fluorinated organic compound. The present invention also provides a gaseous composition including methane and a poly(alkylene oxide) or derivative thereof. The gaseous compositions may include water and/or solvent (e.g., methanol).

The skilled artisan, after reviewing the instant disclosure, will recognize that various factors may be taken into account for use of the present invention including, for example, the ionic strength of the composition, pH (e.g., a range from a pH of about 4 to about 10), and the radial stress at the wellbore (e.g., about 1 bar to about 1000 bars). In some circumstances, the solvent may include, for example, one or more lower alkyl alcohols. In some embodiments of methods according to the present invention, the measured gas relative permeability of the clastic formation increases at least 2, 3, 4, 5, 10, 25, 50, 75, 100, 150, 200, 250, or even at least 300 percent and/or condensate relative permeability increases at least 2, 3, 4, 5, 10, 25, 50, 75, 100, 150, 200, 250, or even at least 300 percent as compared to the hydrocarbon flow prior to the injection of the composition (i.e., the hydrocarbon production flow just prior to when the composition was used). In some cases, the increase in hydrocarbon recovery from the clastic formation may be at least 10, 25, 50, 75, 100, 200, 300, 500, 1000 or even 2000 percent. The increased recovery may be in the form of a gas, a liquid (e.g., a condensate), or a combination thereof. The compositions and methods of the present invention will typically find particular use at or about the critical point in phase space to release, reduce, or modify a condensate blockage. One method to measure the effect of the composition on a clastic formation is to measure the increase in hydrocarbon production as a result of decreased liquid saturation or change in wettability. The present invention may even be used in clastic formations during the process of fracturing or in formations that have already been fractured and that may be at least partially oil wet, water wet, or mixed wet.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION

Figure 1:
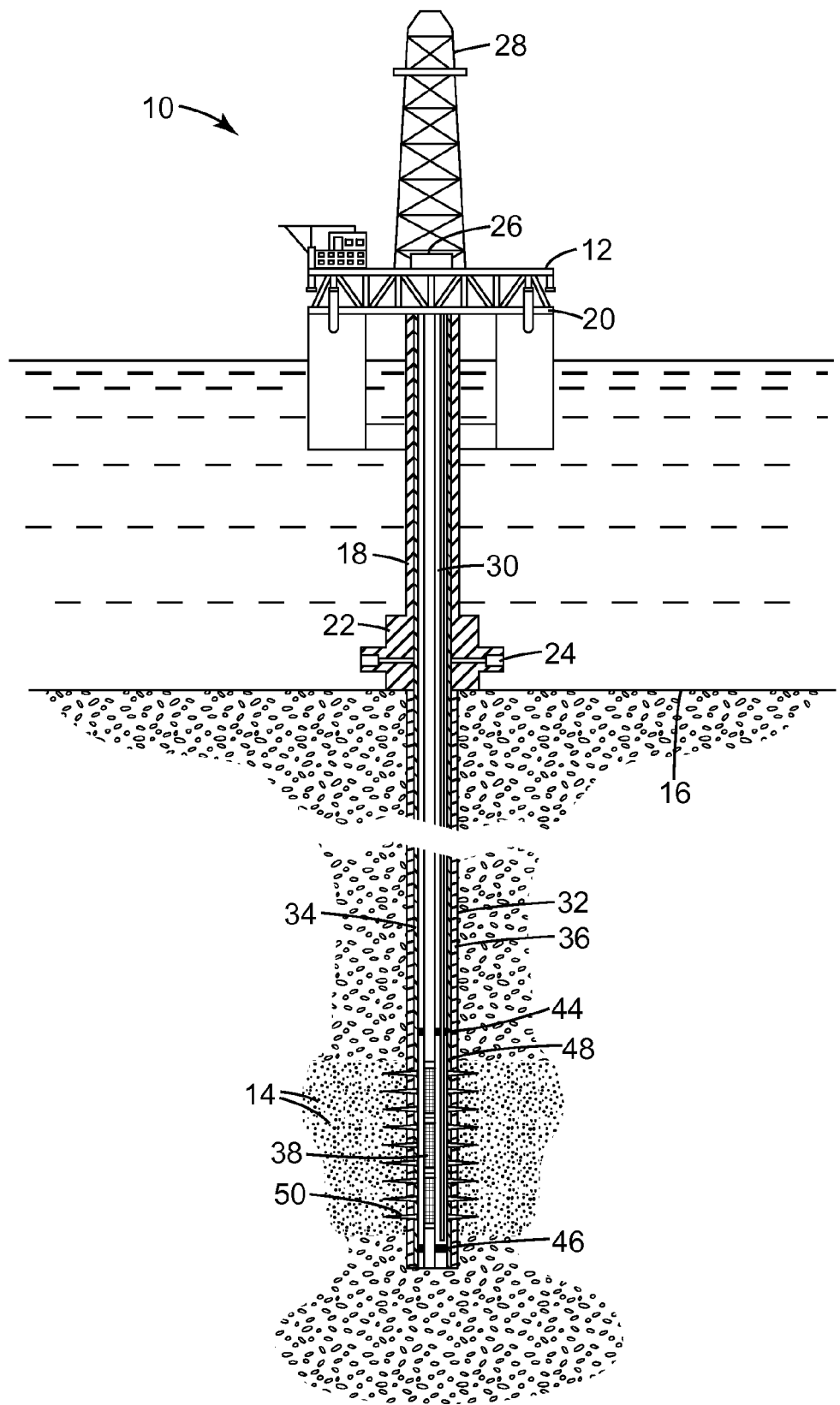
FIG. 1 is a schematic illustration of an exemplary embodiment of an offshore oil and gas platform operating an apparatus for progressively treating a zone of a wellbore according to the present invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "downhole conditions" refers to the temperature, pressure, humidity, and other conditions that are commonly found in subterranean clastic formation.

As used herein, the term "hydrolyzable silane group" refers to a group having at least one Si—O—Z moiety that undergoes hydrolysis with water at a pH between about 2 and about 12, wherein Z is H or substituted or unsubstituted alkyl or aryl.

As used herein, the term "interactive" refers to the interaction between the nonionic fluorinated polymeric surfactant, solvent and other components with a clastic formation under downhole conditions as measured by a change in the permeability of gas and condensate at a productive zone. Interactive is a functional definition that refers to changes to the wettability of a rock surface and/or clastic formation, and may include some other interaction (e.g., adsorption). Other methods of determining the interaction of the compositions according to the present invention include an increase in the relative permeabilities for gas and condensate recovery. Another method of determining the interaction of the compositions includes the amount or percentage of residual oil saturation in the pore space. For example, the present invention may be used to reduce the residual oil (i.e., condensate or other liquid hydrocarbon) saturation of a clastic formation from, for example, 30 percent to 15 percent.

As used herein, the term "nonionic" refers to being free of ionic groups (e.g., salts) or groups (e.g., —$CO_2H$, —$SO_3H$, —$OSO_3H$, —$P(=O)(OH)_2$) that are readily substantially ionized in water.

As used herein, the term "polymer" refers to a molecule of molecular weight of at least 1000 grams/mole, the structure of which essentially includes the multiple repetition of units derived, actually or conceptually, from molecules of low relative molecular mass.

As used herein, the term "polymeric" refers to including a polymer.

As used herein, the term "solvent" refers to a liquid material (exclusive of any water with which it may be combined) that is capable of at least partially dissolving the nonionic fluorinated polymeric surfactant with which it is combined at room temperature (25° C.).

As used herein, the term "surfactant" refers to a surface-active material.

As used herein, the term "water-miscible" refers to molecules soluble in water in all proportions.

As used herein, the term "well productivity" refers to the capacity of a well to produce hydrocarbons. That is, it is the ratio of the hydrocarbon flow rate to the pressure drop, where the pressure drop is the difference between the average reservoir pressure and the flowing bottom hole well pressure (i.e., flow per unit of driving force).

Suitable solvents include, for example, water-miscible solvents. Examples of solvents for use with the present invention include polar solvents such as, for example, alcohols (e.g., methanol, ethanol, isopropanol, propanol, or butanol), glycols (e.g., ethylene glycol or propylene glycol), or glycol ethers (e.g., ethylene glycol monobutyl ether or those glycol ethers available under the trade designation "DOWANOL" from Dow Chemical Co., Midland, Mich.); easily gasified fluids such as, for example, ammonia, low molecular weight hydrocarbons or substituted hydrocarbons including condensate, or supercritical or liquid carbon dioxide; and mixtures thereof. In some embodiments, the solvent is methanol, ethanol, propanol, isopropanol, butanol, ethylene glycol, acetone, a glycol ether, supercritical carbon dioxide, liquid carbon dioxide, or a mixture thereof. The degree of branching, molecular weight and stereo configuration of the solvent may also be considered along with the chemical constituents (e.g., hydrophilic groups and ionic nature) to determine the solubility, attraction, repulsion, suspension, adsorption and other properties that determine the strength of attachment to the clastic formation or suspension in a fluid, as well as the fluid properties including adsorption, hydration, and resistance to or promotion of fluid flow for either aqueous or organic fluids.

Exemplary nonionic fluorinated polymeric surfactants include nonionic polyether and fluorinated polymeric surfactants such as those including a fluoroaliphatic polymeric ester.

The nonionic fluorinated polymeric surfactants include those in which a plurality of nonafluorobutanesulfonylamido groups are linked to poly(alkyleneoxy) moieties through a polymeric chain. Poly(alkyleneoxy) moieties are typically soluble over a wide range of polarity by alteration of the carbon-oxygen ratio.

In some embodiments, the nonionic fluorinated polymeric surfactant includes a fluoroaliphatic polymeric ester with a number average molecular weight in the range from 1,000 to 30,000 (in some embodiments, in a range from 1,000 to 20,000 g/mole, or even from 1,000 to 10,000 g/mole).

It is also within the scope of the present invention to use mixtures of nonionic fluorinated polymeric surfactants.

Nonionic fluorinated polymeric surfactants can be prepared, for example, by techniques known in the art, including, for example, by free radical initiated copolymerization of a nonafluorobutanesulfonamido group-containing acrylate with a poly(alkyleneoxy) acrylate (e.g., monoacrylate or diacrylate) or mixtures thereof. Adjusting the concentration and activity of the initiator, the concentration of monomers, the temperature, and the chain-transfer agents can control the molecular weight of the polyacrylate copolymer. The description of the preparation of such polyacrylates is described, for example, in U.S. Pat. No. 3,787,351 (Olson), the disclosure of which is incorporated herein by reference. Preparation of nonafluorobutanesulfonamido acrylate monomers are described, for example, in U.S. Pat. No. 2,803,615 (Ahlbrecht et al.), the disclosure of which is incorporated herein by reference. Examples of fluoroaliphatic polymeric esters and their preparation are described, for example, in U.S. Pat. No. 6,664,354 (Savu et al.), the disclosure of which is incorporated herein by reference.

Methods described above for making nonafluorobutylsulfonamido-containing structures may be used to make heptafluoropropylsulfonamido group-containing structures by starting with heptafluoropropylsulfonyl fluoride, which can be made, for example, by the methods described in Examples 2 and 3 of U.S. Pat. No. 2,732,398 (Brice et al.), the disclosure of which is incorporated herein by reference.

The nonionic fluorinated polymeric surfactants generally dissolve at room temperature in the solvent-water mixture, but also, remain interactive or functional under downhole conditions (e.g., at typical down-hole temperatures and pressures). Although not wanting to be bound by theory, it is believed the nonionic fluorinated polymeric surfactants generally adsorb to clastic formations under downhole conditions and typically remain at the target site for the duration of an extraction (e.g., 1 week, 2 weeks, 1 month, or longer).

The ingredients for compositions described herein including nonionic fluorinated polymeric surfactants, water, and solvent can be combined using techniques known in the art for combining these types of materials, including using conventional magnetic stir bars or mechanical mixer (e.g., in-line static mixer and recirculating pump).

Referring to FIG. 1, an exemplary offshore oil and gas platform is schematically illustrated and generally designated 10. Semi-submersible platform 12 is centered over submerged oil and/or gas (clastic) formation 14 located below sea floor 16. Subsea conduit 18 extends from deck 20 of platform 12 to wellhead installation 22 including, for example, blowout preventers 24. Platform 12 is shown with hoisting apparatus 26 and derrick 28 for raising and lowering pipe strings such as work string 30.

Wellbore 32 extends through the various earth strata including hydrocarbon-bearing subterranean clastic formation 14. Casing 34 is cemented within wellbore 32 by cement 36. Work string 30 may include various tools including, for example, sand control screen assembly 38 which is positioned within wellbore 32 adjacent to clastic formation 14. Also extending from platform 12 through wellbore 32 is fluid delivery tube 40 having fluid or gas discharge section 42 positioned adjacent to clastic formation 14, shown with production zone 48 between packers 44, 46. When it is desired to treat zone 48, work string 30 and fluid delivery tube 40 are lowered through casing 34 until sand control screen assembly 38 and fluid discharge section 42 are positioned adjacent to clastic formation 14 including perforations 50. Thereafter, a composition described herein is pumped down delivery tube 40 to progressively treat zone 48.

While FIG. 1 depicts an offshore operation, the skilled artisan will recognize that the compositions and methods for treating a production zone of a wellbore are equally well-suited for use in onshore operations. Also, while FIG. 1 depicts a vertical well, the skilled artisan will also recognize that compositions and methods for wellbore treatment of the present invention are equally well-suited for use in deviated wells, inclined wells or horizontal wells.

Figure 2:
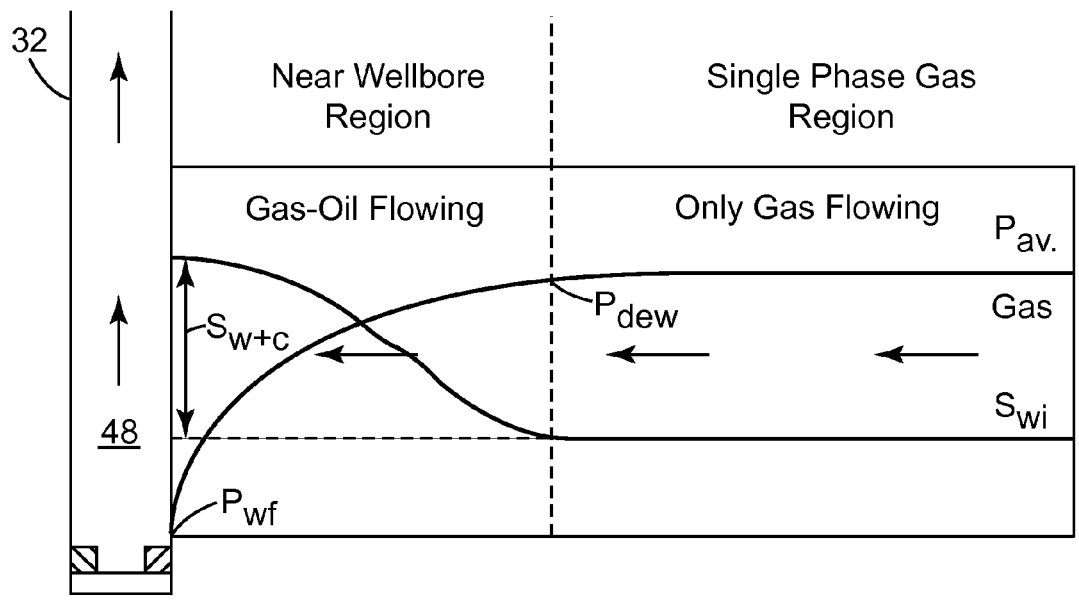
FIG. 2 is a cross-section view of an exemplary embodiment of a production zone at the wellbore next to a graph that describes the problem associated with the productivity of gas-condensate wells.

FIG. 2 is a cross-section view of an exemplary production zone at the wellbore 32 next to a graph that describes the problems associated with the productivity of gas condensate wells when the near wellbore pressure drops below the dew point pressure, often referred to as the condensate banking problem. A cross-sectional view of the wellbore 32 is shown next to the basic flow characteristics of oil and gas at a production zone. Briefly, the near wellbore region and the adjacent single-phase gas region are depicted with the flow of gas-oil indicated by arrows. As the average pressure, $P_{av}$, decreases toward the dew pressure, $P_{dew}$, an increase in oil-gas is observed over gas alone. As the formation pressure reaches $P_{dew}$, oil blocks the flow of gas thereby reducing the efficiency of gas flow and recovery of gas. The productivity of gas condensate wells is reduced substantially (by a factor of 2 to 3) when the near wellbore pressure drops below the dew point pressure. This problem is commonly encountered in gas wells producing from gas condensate fields.

Figure 3:
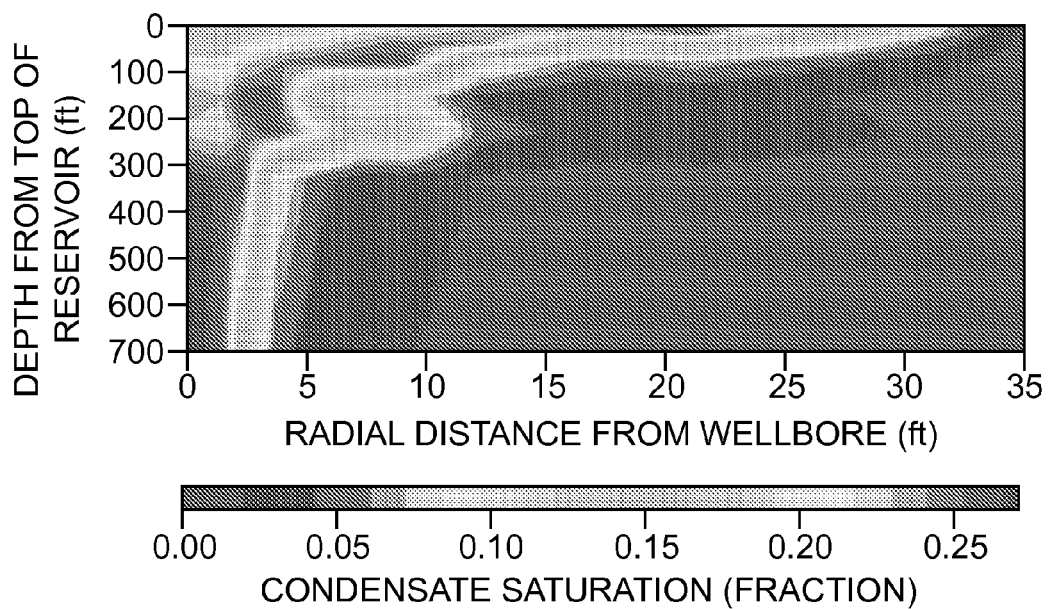
FIG. 3 is a graph that depicts a calculated near-wellbore condensate saturation.

FIG. 3 depicts a calculated near wellbore gas-condensate saturation. The present invention includes compositions and methods for the injection of nonionic fluorinated polymeric surfactants that modify the wetting properties of the rock in the near wellbore region to allow the water and the gas-condensate to flow more easily into the wellbore. The compositions and methods taught herein cause an increase in the relative gas and condensate permeabilities at the site of treatment, namely, the near wellbore region.

Hydraulic fracturing is commonly used to increase the productivity of gas-condensate blocked wells, that is, wells that having a gas-condensate bank near the wellbore. However, the hydraulic fracturing method is relatively expensive, and may not be applicable in cases where a water bearing clastic formation exists near the gas bearing clastic formation (for concern of fracturing into the water bearing sand).

However, in some instances it may be desirable to utilize fracturing techniques and/or proppants as known in the art in conjunction with the instant invention to increase the production of hydrocarbon extraction from subterranean clastic formations. It may also be desirable to treat proppant with a composition described herein prior to injecting the well. Sand proppants are available, for example, from Badger Mining Corp., Berlin, Wis.; Borden Chemical, Columbus, Ohio; Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example 1

Core Flood Setup

Figure 4:
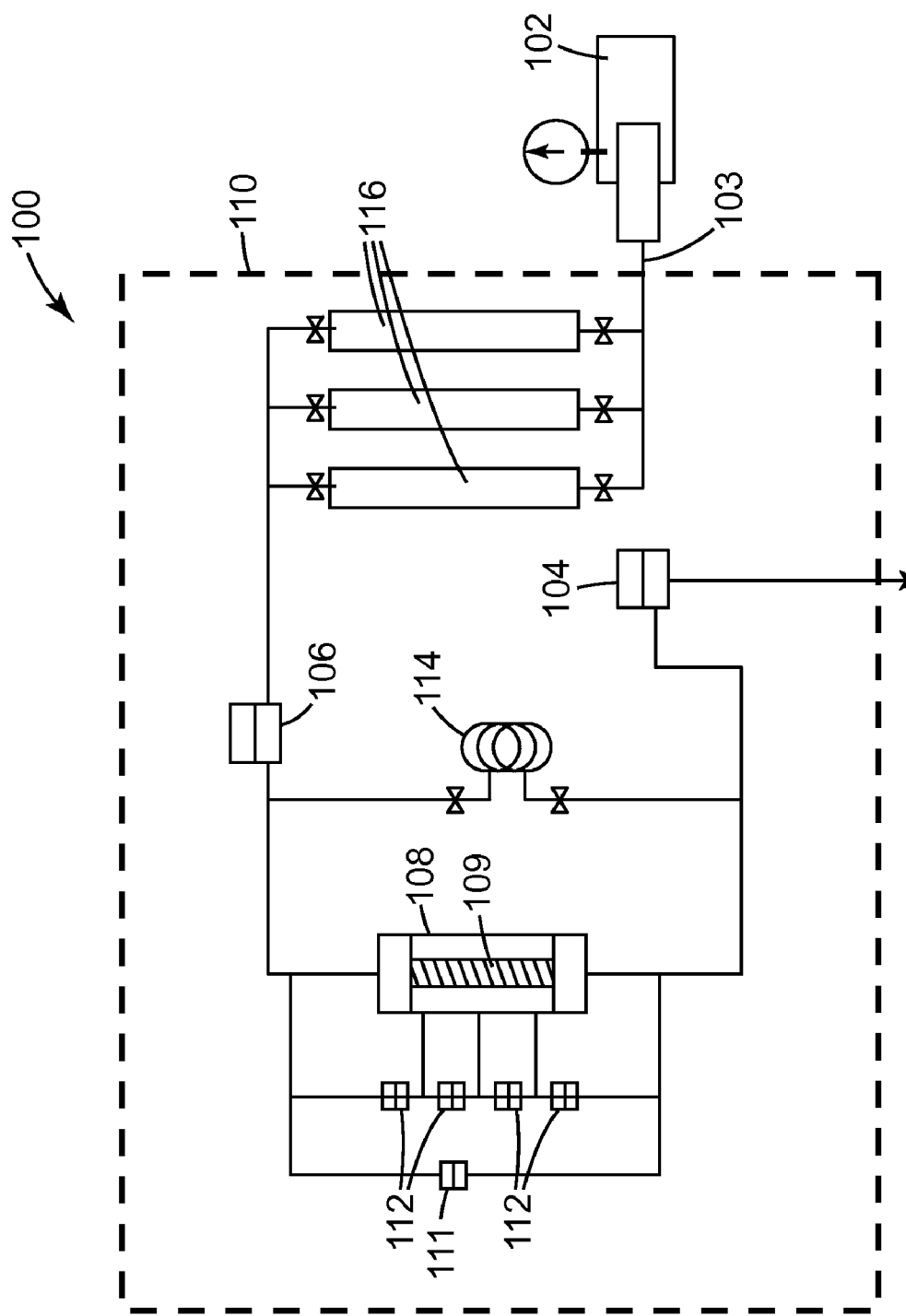
FIG. 4 is a schematic of core flood set-up used for the Examples.

A schematic diagram of core flood apparatus 100 used to determine relative permeability of the substrate sample is shown in FIG. 4. Core flood apparatus 100 included positive displacement pumps (Model No. 1458; obtained from General Electric Sensing, Billerica, Mass.) 102 to inject fluid 103 at constant rate in to fluid accumulators 116. Multiple pressure ports 112 on core holder 108 were used to measure pressure drop across four sections (2 inches in length each) of core 109. Two back-pressure regulators (Model No. BPR-50; obtained from Temco, Tulsa, Okla.) 104, 106 were used to control the flowing pressure upstream 106 and downstream 104 of core 109. Pressure Volume Temperature (PVT) cell (Model No. 310; obtained from Temco, Tulsa, Okla.) was used to visually measure liquid drop out. The flow of fluid was through a vertical core to avoid gravity segregation of the gas.

High-pressure core holder (Hassler-type Model UTPT-1x8-3K-13 obtained from Phoenix, Houston Tex.) 108, back-pressure regulators 106, fluid accumulators 116, and tubing were placed inside a pressure- and temperature-controlled oven (Model DC 1406F; maximum temperature rating of 650° F. obtained from SPX Corporation, Williamsport, Pa.) at the temperatures tested. The maximum flow rate of fluid was 7,000 cc/hr.

Three synthetic gas-condensate fluids were prepared having the compositions listed in Table 1, below.

TABLE 1

|  | Component | Mole % |
|---|---|---|
| Fluid I | Methane | 78.5 |
|  | n-Butane | 15 |
|  | n-Heptane | 5 |
|  | n-Decane | 1.5 |
| Fluid II | Methane | 83 |
|  | n-Butane | 4 |
|  | n-Heptane | 7.2 |
|  | n-Decane | 4 |
|  | n-Dodecane | 1.8 |
| Fluid III | Methane | 93 |
|  | n-Butane | 4 |
|  | n-Decane | 2 |
|  | n-Pentadecane | 1 |

Various properties of Fluids I, II, and III were determined as described below, and are listed in Table 2, below.

TABLE 2

|  | Fluid I (145° F.) | Fluid II (250° F.) | Fluid III (275° F.) |
|---|---|---|---|
| Dewpoint (psig) | 2,875 | 3,850 | 4,153 |
| Core pressure (psig) | 1,200 | 1,500 | 1,500 |
| Liquid dropout (V/Vt) % | 7.1 | 10.2 | 3.2 |
| Gas viscosity (cP) | 0.0173 | 0.0170 | 0.0165 |
| Oil viscosity (cP) | 0.128 | 0.167 | 0.216 |
| Interfacial tension (dynes/cm) | 4.2 | 4.3 | 5.0 |

Dew point and Liquid drop out was measured using the pressure volume temperature cell described above. Gas viscosity and oil viscosity values were determined using the capillary viscometer 114. The capillary viscometer consists of a stainless steel (SS-316) capillary tube with $1/16^{th}$ inch outer diameter purchased from Swagelok. Interfacial tension was measured using a spinning drop tensiometer (available from The University of Texas at Austin, Austin, Tex.).

Substrates

The substrates for core flooding evaluation were sandstone core plugs obtained from Cleveland Quarries, Vermillion, Ohio, under the trade designation "BEREA SANDSTONE" (there were 14 similar "BEREA SANDSTONE" cores used for the Examples 1-9 and Comparative Examples A-E (i.e., one core for each example)). Example 10 used a reservoir sandstone core from a gas-condensate well in the North Sea. Various properties of these core plugs are listed in Table 3, below. The pore volume and porosity values were determined as describe below. The porosity was measured using either a gas expansion method or by the weight difference between a dry and a fully saturated core sample. The pore volume is the product of the bulk volume and the porosity.

TABLE 3

|  | Sandstone Core |
|---|---|
| Diameter (inch) | 1.0 |
| Length (inch) | 8.0 |
| Pore volume (cc) | 20.6 |
| Porosity (%) | 20.0 |

The cores were dried for 72 hours in a standard laboratory oven at 95° C., and then were wrapped in aluminum foil and heat shrink tubing (obtained under the trade designation "TEFLON HEAT SHRINK TUBING" from Zeus, Inc., Orangeburg, S.C.). The wrapped core was placed in core holder 108 inside oven 100 at 145° F. After four hours, an axial pressure was applied by screwing the end pieces of the core holder. An overburden pressure of 3,400 psig was applied. Holes were drilled through the pressure taps (⅛ inch). The initial gas permeability was measure using methane at a flowing pressure of 3,000 psig.

Water Saturation Procedure

Water was introduced into the core 109 using a vacuum push-pull technique. Core holder 108 was taken outside the oven to cool at room temperature. The outlet end of the core holder was connected to a vacuum pump and a full vacuum was applied for 5 hours. The inlet end was closed. The core holder 108 was placed inside the oven 100 at 145° F. and opened to atmospheric pressure. The core holder 108 was allowed to reach an equilibrium temperature. Then, a series of push-pull cycles were applied using a hand pump (Catalog No. 1458/59 WI, obtained from Ruska Instrument Corporation, Houston, Tex.) through the outlet of the core holder 108. Between each push and pull cycle, a break of 15 minutes was taken to allow water vapor to distribute through core 109. The water saturation procedure was completed after 32 push-pull cycles.

Composition

The Example 1 composition was 2 percent by weight nonionic fluorinated polymeric surfactant (obtained from 3M Company, St. Paul, Minn., under the trade designations "NOVEC FLUOROSURFACTANT FC-4430"), 0 percent by weight water, and 98 percent by weight methanol, prepared by mixing the ingredients together using a magnetic stirrer and magnetic stir bar. An initial water saturation of 0.4 was present in the core.

Core Flooding Procedure

The following procedure was used to determine the single-phase gas permeabilities of the substrates listed in Table 3, above. Referring again to FIG. 4, the single-phase gas permeability of each core was measured before treatment by flowing methane through core 109 at a flow rate of 85 cc/hour using positive displacement pump 102 until a steady state was reached. The composition described above was then injected in core 109 at a flow rate of 85 cc/hour to study the effect of capillary number on gas and condensate relative permeabilities. Upstream back-pressure regulator 106 was set at 3,000 psig the dew point pressure of the fluid and downstream back-pressure regulator 104 was set at a 1,200 psig the dew point pressure corresponding to the bottom hole flowing well pressure. Results are listed in Table 4, below.

TABLE 4

|  | Ex-1 | Ex-2 | Comparative Ex A | Ex 3 | Ex-4 | Ex-5 | Comparative Ex B |
|---|---|---|---|---|---|---|---|
| Gas permeability, md | 230.0 | 230.0 | 220.0 | 95 | 115.0 | 216.0 | 236.0 |
| Initial water saturation | 0.4 | 0.4 | 0.0 | 0.0 | 0.0 | 0.0 | 0.0 |
| Temperature (° F., ° C.) | 145, 63 | 145, 63 | 145, 63 | 145, 63 | 250, 121 | 250, 121 | 250, 121 |
| Water concentration (wt %) | 0.0 | 0.0 | 4.0 | 4.0 | 4.0 | 4.0 | 4.0 |
| Surfactant concentration (wt %) | FC4430 (2.0) | FC4432 (2.0) | FS10 (2.0) | FC4430 (2.0) | FC4430 (2.0) | FC4430 (0.25) | FS10 (2.0) |
| Capillary number | $1.38 \times 10^{-5}$ | $1.38 \times 10^{-5}$ | $1.01 \times 10^{-5}$ | $4.54 \times 10^{-6}$ | $7.76 \times 10^{-6}$ | $6.34 \times 10^{-5}$ | $7.77 \times 10^{-5}$ |
| Gas relative permeability before treatment | 0.011 | 0.011 | 0.014 | 0.036 | 0.08 | 0.067 | 0.062 |
| Gas relative permeability after treatment | 0.011 | 0.011 | 0.028 | 0.103 | 0.246 | 0.181 | 0.072 |
| Improvement factor | 1.0 | 1.0 | 2.00 | 2.86 | 3.08 | 2.70 | 1.16 |

|  | Ex 6 | Ex-7 | Ex-8 | Ex 9 | Comparative Ex C | Comparative Ex D | Comparative Ex E |
|---|---|---|---|---|---|---|---|
| Gas permeability, md | 225.0 | 512.0 | 348.0 | 487.0 | 220.0 | 260 | 260 |
| Initial water saturation | 0.0 | 0.0 | 0.0 | 0.0 | 0.0 | 0.0 | 0.0 |
| Temperature (° F., ° C.) | 250, 121 | 250, 121 | 250, 121 | 250, 121 | 145, 63 | 250, 121 | 250, 121 |
| Water concentration (wt %) | 4.0 | 25.0 | 10.0 | 4.0 | 4.0 | 0.0 | 0.0 |
| Surfactant concentration (wt %) | FC4432 (2.0) | FC4430 (2.0) | FC4430 (2.0) | FC4430 (2.0) | Fluorosyl (2.0) | FC4430 (2.0) | FC4430 (2.0) |
| Capillary number | $8.35 \times 10^{-5}$ | $5.07 \times 10^{-5}$ | $5.28 \times 10^{-5}$ | $8.05 \times 10^{-5}$ | *plugged | $2.77 \times 10^{-5}$ | $2.77 \times 10^{-5}$ |
| Gas relative permeability before treatment | 0.064 | 0.074 | 0.062 | 0.127 | 0.01 | 0.079 | 0.064 |
| Gas relative permeability after treatment | 0.072 | 0.108 | 0.126 | 0.263 | *plugged | 0.079 | 0.069 |
| Improvement factor | 1.13 | 1.46 | 2.03 | 2.07 | **N/A | 1.0 | 1.08 |

*Plugged means that after the treatment the core was impermeable
**N/A There was no improvement since the core was plugged

Example 2

The procedure described above for Example 1 was followed for Example 2, except the "NOVEC FLUOROSURFACTANT FC-4430" surfactant was replaced with a surfactant obtained from 3M Company under the trade designation "NOVEC FLUOROSURFACTANT FC-4432". Results are listed in Table 4, above.

Example 3

The procedure described above for Example 1 was followed for Example 3 except no water saturation procedure was performed, and the water concentration in the composition was 4%. Results are listed in Table 4, above.

Example 4

The procedure described above for Example 1 was followed for Example 4, except no water saturation procedure was performed, the testing was conducted at 250° F. (121° C.), water concentration in the composition was 4%. Results are listed in Table 4, above.

Figure 5:
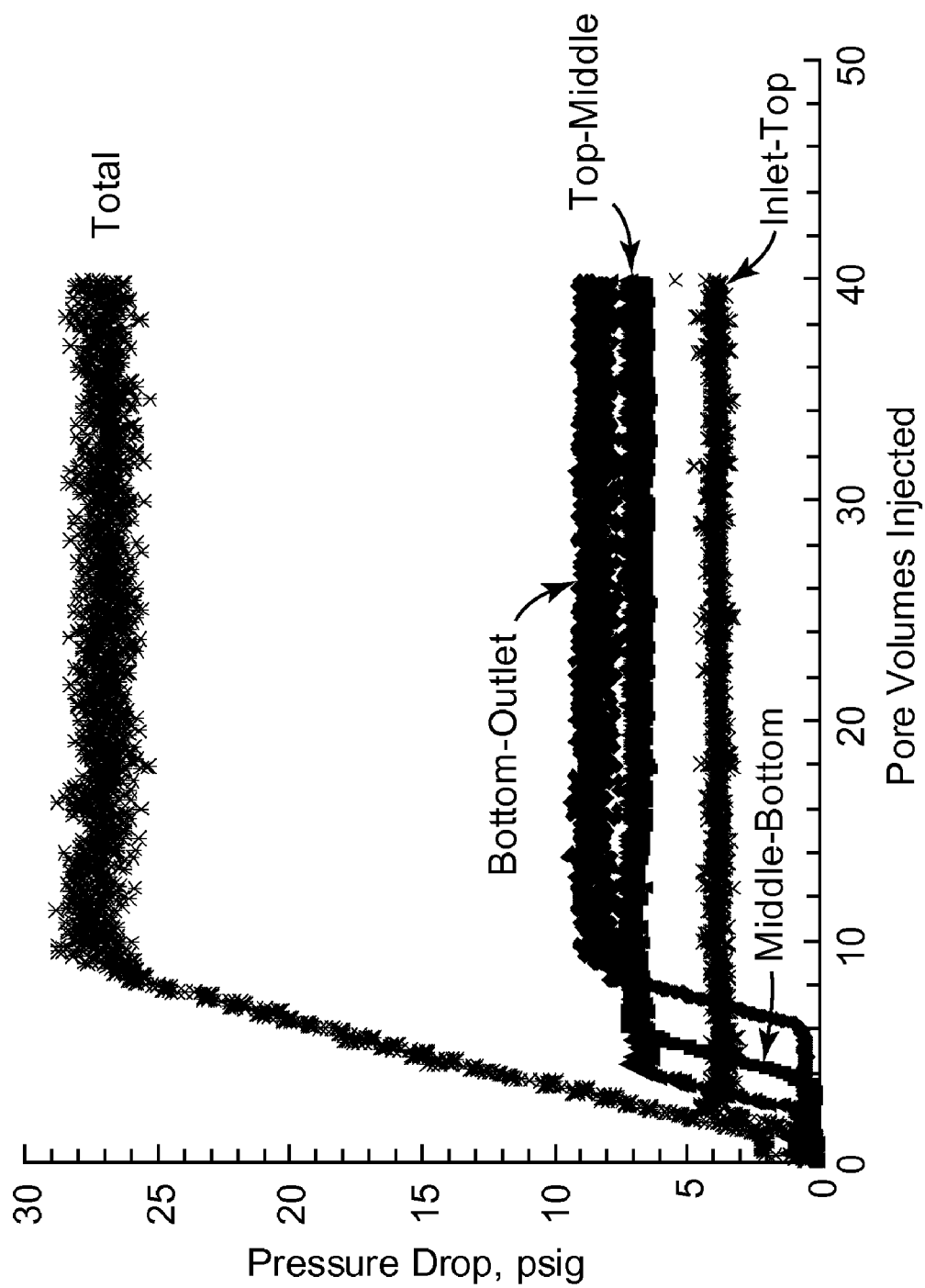
FIG. 5 is a graph that illustrates pressure drop data observed across different sections and the total length of the core as the process of condensate accumulation occurred in Example 4.

FIG. 5 illustrates pressure drop data observed across different sections and the total length of the core as the process of condensate accumulation occurred for Example 4. The relative permeability of the gas and condensate was then calculated from the steady state pressure drop.

Figure 6:
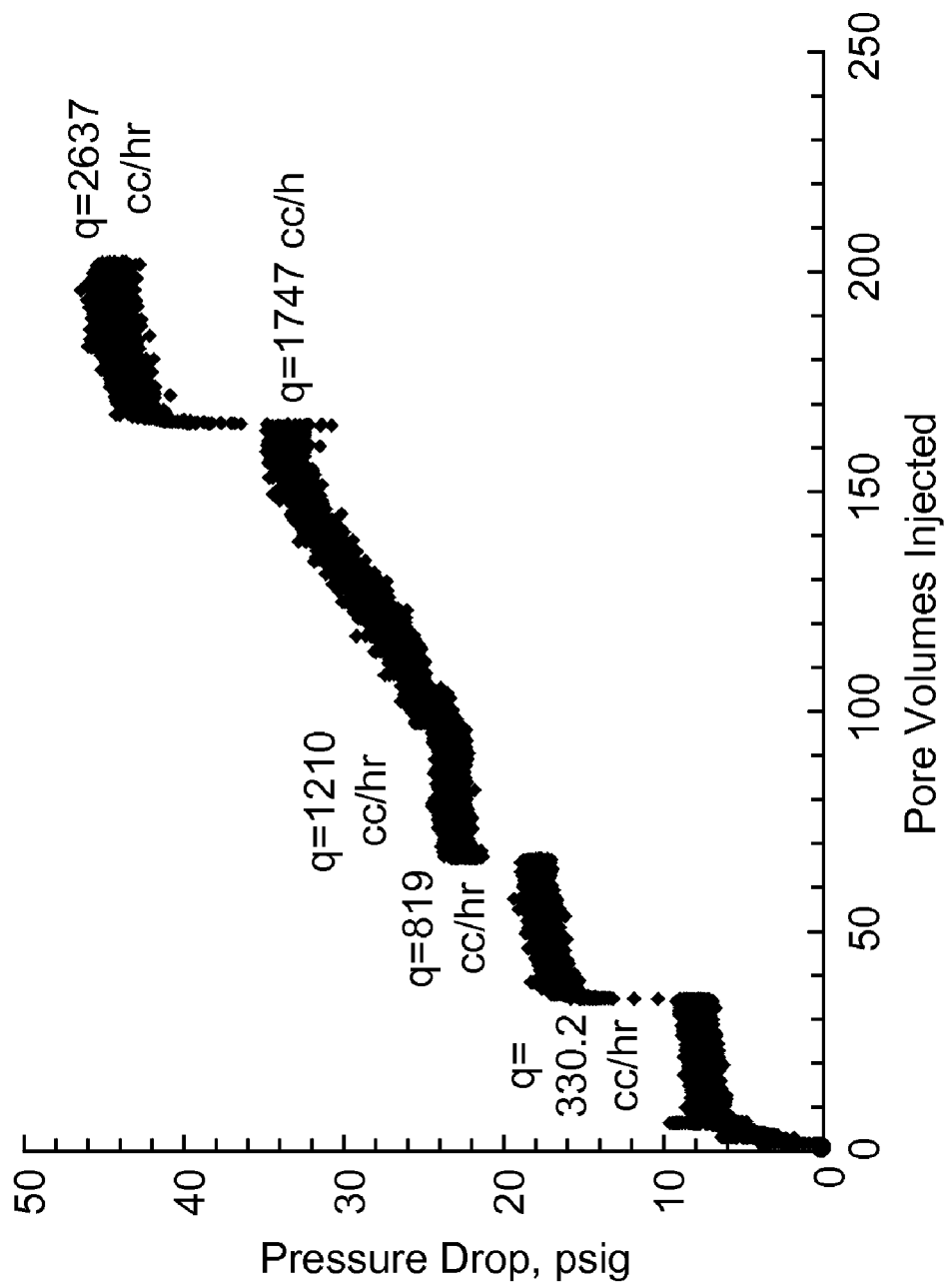
FIG. 6 is a graph that depicts the pressure drop in the core for Example 4 during dynamic condensate accumulation at 1,500 psig and 250° F. at different flow rates ranging from 330 cc/hr to 2637 cc/hr.

FIG. 6 shows the pressure drop in a "BEREA SANDSTONE" core for Example 4 during dynamic condensate accumulation at 1,500 psig and 250° F. at different flow rates ranging from 330 cc/hr to 2637 cc/hr. The gas relative permeability decreases by 90% of the initial value during condensate accumulation corresponding to a condensate bank. FIG. 5 shows the overall pressure drop and sectional pressure drops across the Example 4 "BEREA SANDSTONE" core during dynamic condensate accumulation at 1,500 psig and 250° F. at a flow rate of 302 cc/hr.

Figure 8:
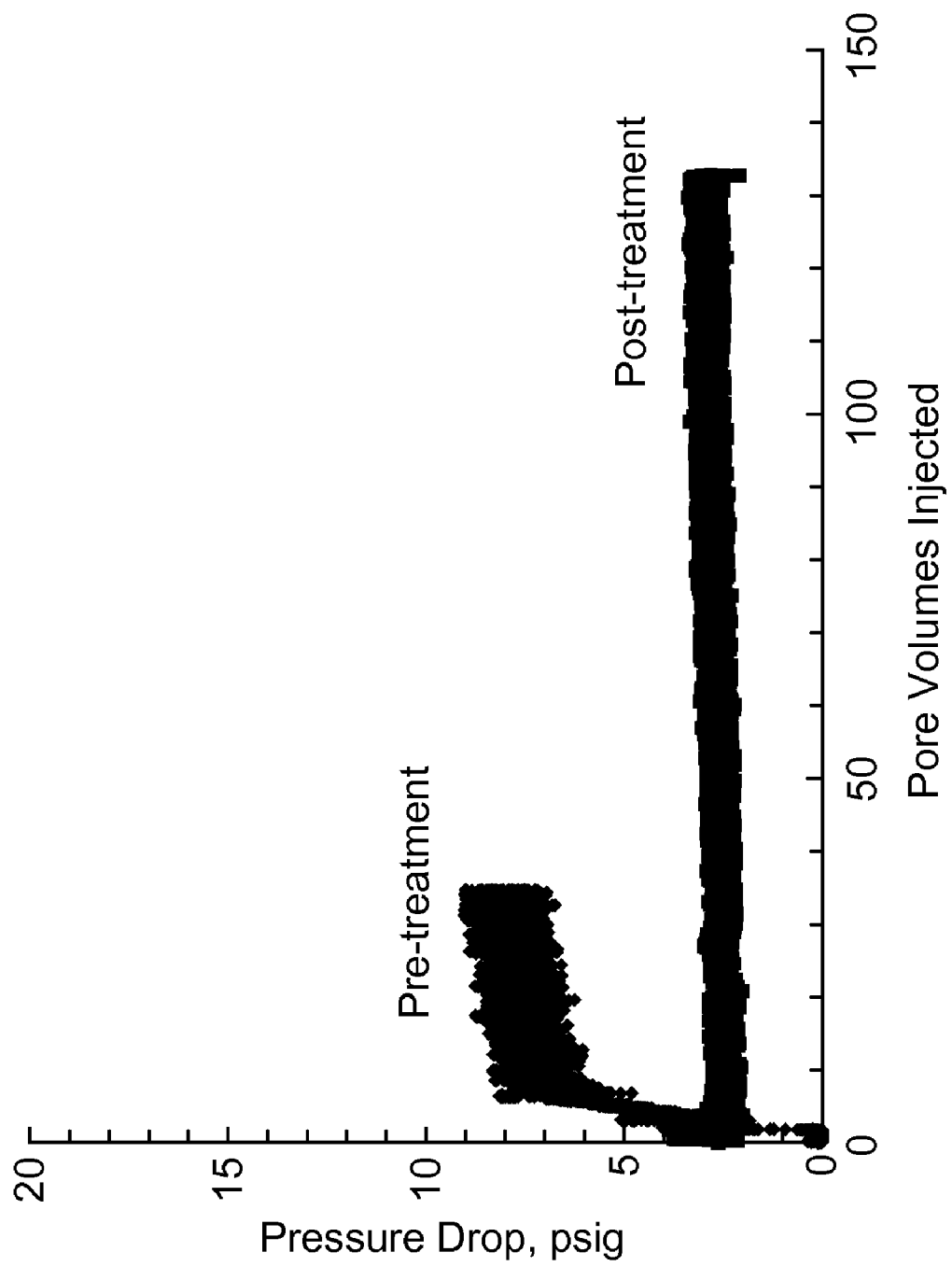
FIG. 8 is graph that depicts the pressure drop in a sandstone core (obtained from Cleveland Quarries, Vermillion, Ohio, under the trade designation "BEREA SANDSTONE") during dynamic condensate accumulation at 1,500 psig and 250° F. before and after Example 4 treatment.

FIG. 8 shows the pressure drop in a "BEREA SANDSTONE" core during dynamic condensate accumulation at 1,500 psig and 250° F. before and after Example 4 treatment at 330 cc/hr.

Example 5

The procedure described above for Example 4 was followed for Example 5, except the concentration of the nonionic fluorinated polymeric surfactant ("NOVEC FLUOROSURFACTANT FC-4430") was 0.25%. Results are listed in Table 4, above.

Example 6

The procedure described above for Example 4 was followed, except the "NOVEC FLUOROSURFACTANT FC-4430" surfactant was replaced with the "NOVEC FLUOROSURFACTANT FC-4432" surfactant. Results are listed in Table 4, above.

Example 7

The procedure described above for Example 4 was followed for Example 7, except the water concentration in the composition was 25%. Results are listed in Table 4, above.

Example 8

The procedure described above for Example 4 was followed for Example 8 except the water concentration in the composition was 10%. Results are listed in Table 4, above.

Example 9

The procedure described above for Example 4 was followed. Results are listed in Table 4, above.

Figure 11:
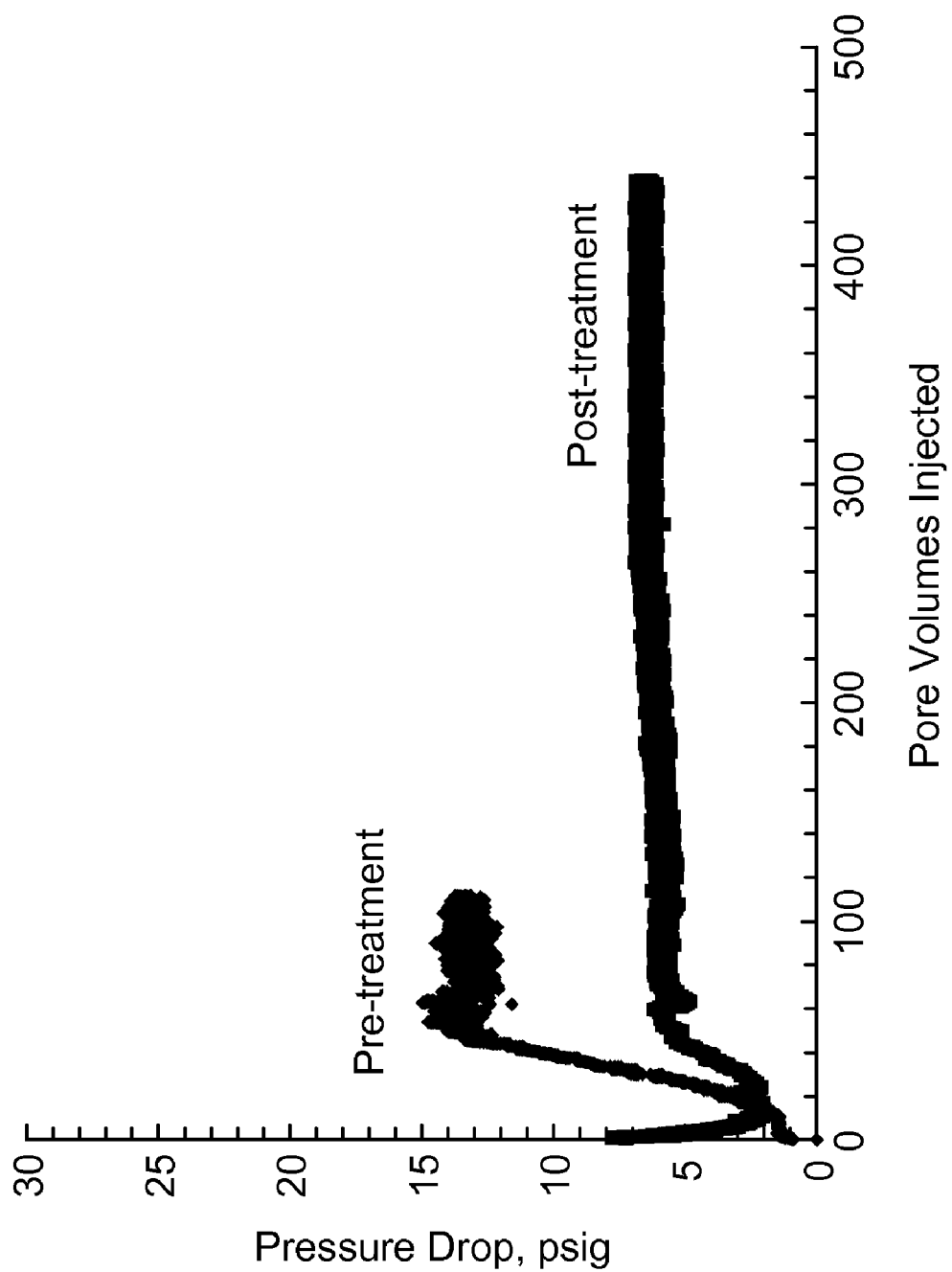
FIG. 11 is a graph that depicts the durability of the Example 9 composition.

The durability of the Example 9 composition was evaluated by injecting almost 4,000 pore volumes of gas mixture at 300 cc/hr following the treatment of a "BEREA SANDSTONE" core at 250° F. (See FIG. 11). The improvement factor was not observed to change during the entire time the gas mixture was injected.

Example 10

The procedure described for Example 1 above was followed, except the coreflooding was conducted on a Reservoir Core A sandstone treated at the temperature and pressure listed in Table 5, below. The Various properties of this substrate are listed in Table 6, below. The pore volume and porosity values were determined as describe above in Example 1 for the "BEREA SANDSTONE" core plugs. Results are listed in Table 5, below.

TABLE 5

|  | Reservoir Core A |
| --- | --- |
| Gas permeability, md | 72.0 |
| Initial water saturation | 0.0 |
| Temperature (° F.) | 275 |
| Water in treatment solution (wt %) | 4.0 |
| Surfactant concentration (wt %) | FC4430 (2.0) |
| Capillary number | $1.03 \times 10^{-5}$ |
| Gas relative permeability before treatment | 0.119 |
| Gas relative permeability after treatment | 0.248 |
| Improvement factor | 2.08 |

TABLE 6

|  | Reservoir Core A |
| --- | --- |
| Diameter (inch) | 1.0 |
| Length (inch) | 3.75 |
| Pore volume (cc) | 8.01 |
| Porosity (%) | 16.6 |

The gas/oil interfacial tension was determined as described above in Example 1 to be about 4 dynes/cm.

Figure 7:
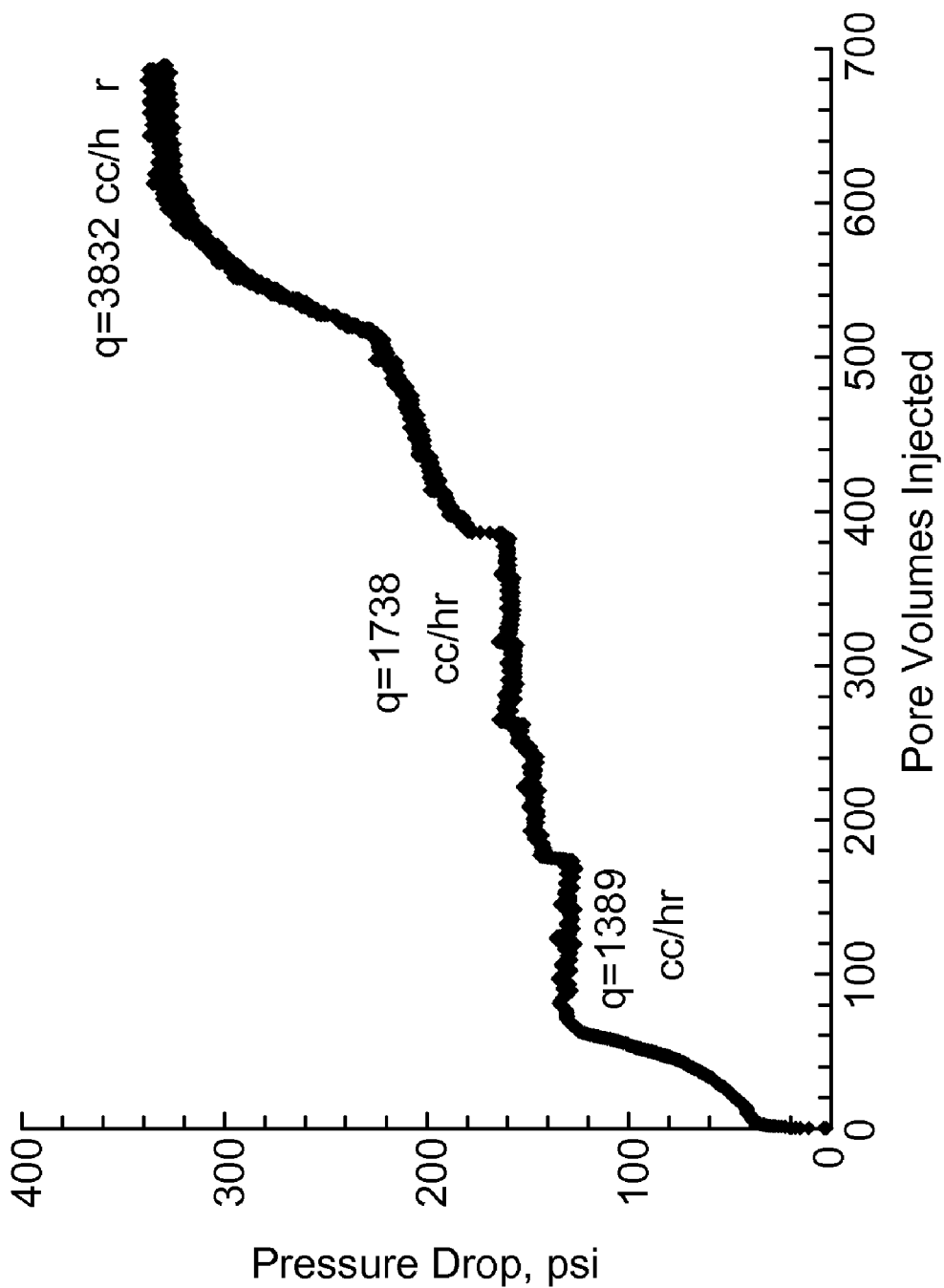
FIG. 7 is a graph that depicts the pressure drop across the reservoir core A, for dynamic condensate accumulation at 1,500 psig and 275° F. at flow rates ranging from 1389 cc/hr to 3832 cc/hr for Example 10.

FIG. 7 shows the pressure drop across the reservoir core A, for dynamic condensate accumulation at 1,500 psig and 275° F. at flow rates ranging from 330 cc/hr to 3811 cc/hr.

Comparative Example A

The procedure described above for Example 4 was followed for Comparative Example A, except the "NOVEC FLUOROSURFACTANT FC-4430" surfactant was replaced with surfactant "obtained from Solvay Solexis Thorofare, N.J., under the trade designation "FLUOROLINK S10", and the testing was conducted at 145° F.

Comparative Example B

The procedure described above for Example 4 was followed for Comparative Example B, except the "NOVEC FLUOROSURFACTANT FC-4430" surfactant was replaced with the "FLUOROLINK S10" surfactant.

Comparative Example C

The procedure described above for Example 4 was followed for Comparative Example C except the "NOVEC FLUOROSURFACTANT FC-4430" surfactant was replaced with surfactant obtained from Cytonix, Beltsville, Md., under the trade designation "FLUOROSYL", and the testing was conducted at 145° F.

Comparative Example D

The procedure described above for Example 1 was followed for Comparative Example D except no water saturation procedure was performed, and the testing was conducted at 250° F. (121° C.). Results are listed in Table 4, above.

Comparative Example E

The procedure described above for Example 1 was followed for Comparative Example E except no water saturation procedure was performed, and the testing was conducted at 250° F. (121° C.). Results are listed in Table 4, above.

Table 4 shows the effect of temperature on the gas relative permeability by use of various compositions (i.e., Examples 1-9 and Comparative Examples A-E).

Figure 9:
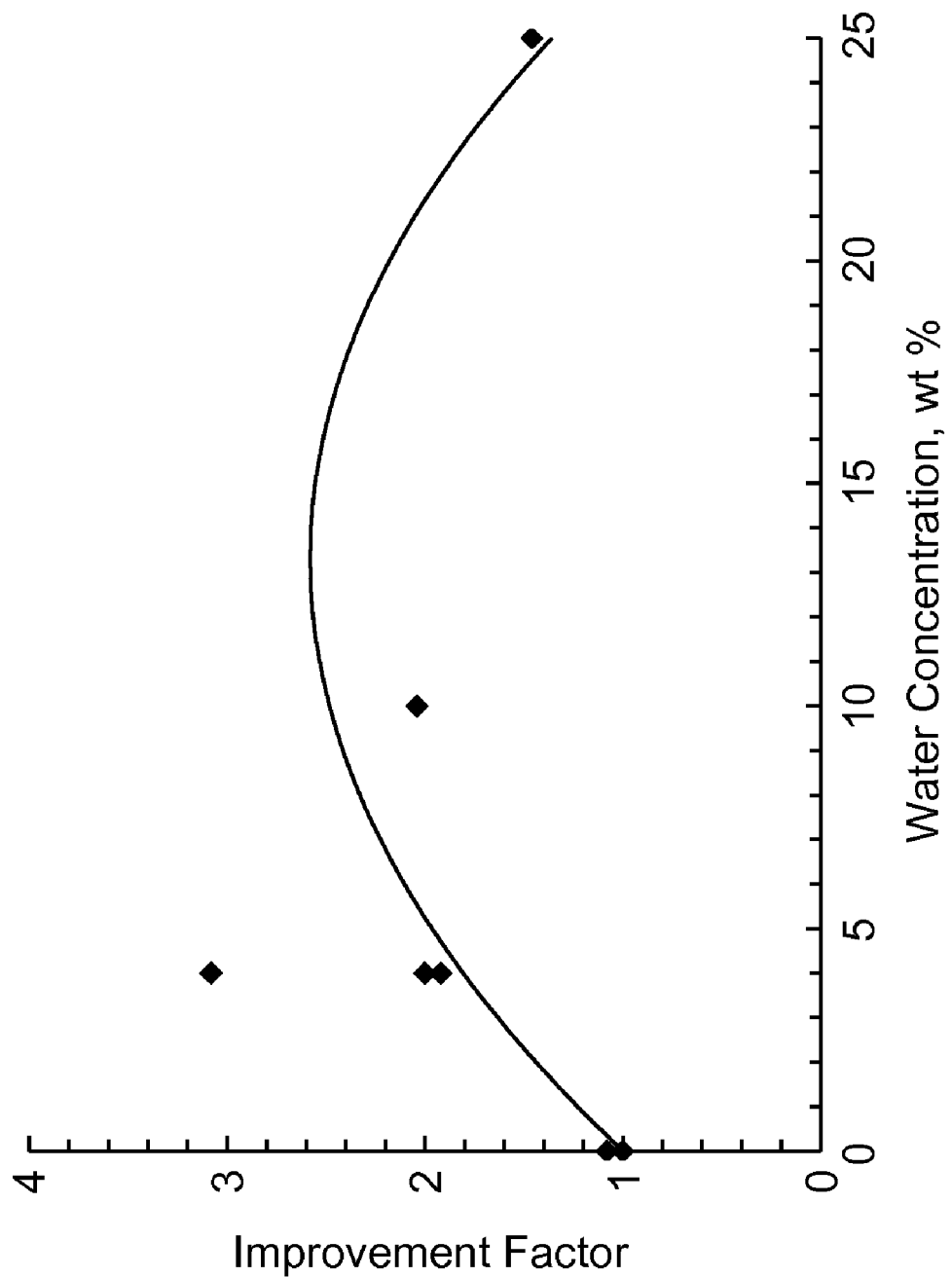
FIG. 9 is a graph that depicts the effect of water concentration in various compositions (i.e., Example 4, Example 7, Example 8, Example 9, Comparative Example D, and Comparative Example E) on the improvement in gas relative permeability after treatment.

FIG. 9 shows the effect of water concentration in various compositions (i.e., Example 4, Example 7, Example 8, Example 9 (at two different flow rates), Comparative Example D, and Comparative Example E) on the improvement in gas relative permeability after treatment with the compositions at 250° F. (121° C.). The concentration of water in these examples and comparative examples ranged from 0% to 25% by weight. As shown in FIG. 9, there was no improvement observed in the gas relative permeability when no water was present in the treatment composition.

Figure 10:
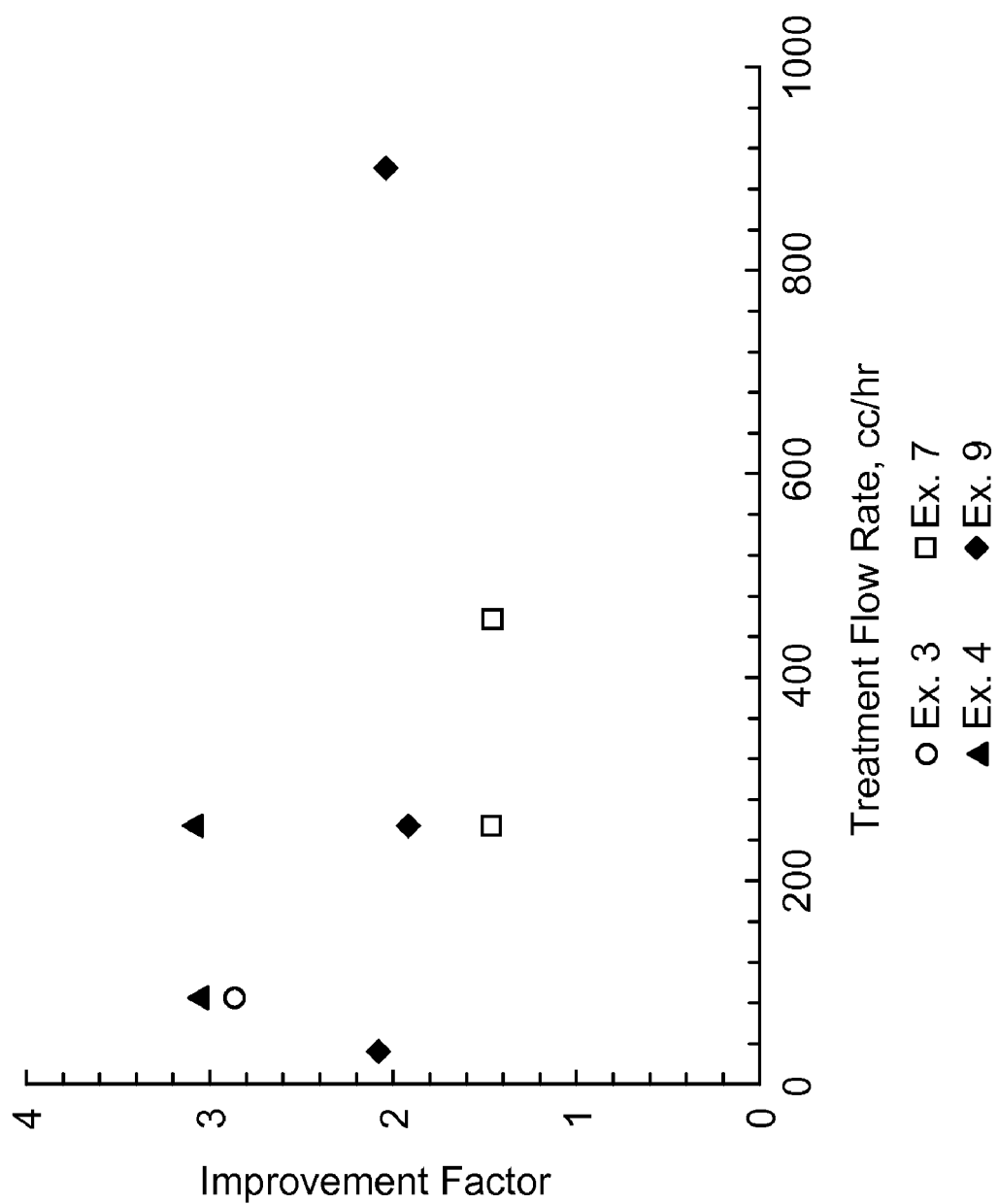
FIG. 10 is a graph that depicts the effect of treatment flow rate on the relative permeability after treatment with the compositions at different temperatures.

FIG. 10 shows the effect of treatment flow rate on the relative permeability after treatment with the compositions of Examples 3, 4, 7, and 9 at different temperatures. The treatment flow rate was varied from 32 cc/hr to 1,200 cc/hr.

Following the relative permeability measurements, methane was injected, using a positive displacement pump as described above, to displace the condensate and measure the final (single phase) gas permeability at the end of the study. The final gas permeability was the same as the original (single phase) gas permeability.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention.

What is claimed is:

1. A method of treating a hydrocarbon-bearing subterranean clastic formation, the method comprising injecting a composition into the hydrocarbon-bearing subterranean clastic formation, the composition comprising solvent, water, and a nonionic fluorinated polymeric surfactant comprising:

(a) at least one divalent unit represented by the formula:

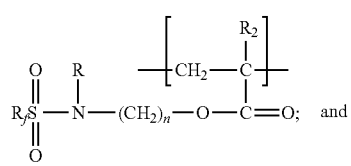

(b) a poly(alkyleneoxy) segment;
wherein
$R_f$ represents a perfluoroalkyl group having from 1 to 8 carbon atoms;
R and $R_2$ are each independently hydrogen or alkyl of 1 to 4 carbon atoms; and
n is an integer from 2 to 10.

2. The method of claim 1, wherein the solvent is a water-miscible solvent, and wherein the nonionic fluorinated polymeric surfactant has a solubility in a mixture of the water-miscible solvent and the water that decreases with an increase in temperature.

3. The method of claim 2, wherein the hydrocarbon-bearing subterranean clastic formation comprises a well, and wherein injecting the composition into the subterranean clastic formation stimulates productivity from the well.

4. The method of claim 2, wherein the hydrocarbon-bearing subterranean clastic formation has a surface, the method further comprising contacting the surface with the composition.

5. The method of claim 1, wherein the poly(alkyleneoxy) segment comprises at least one divalent unit represented by a formula selected from the group consisting of:

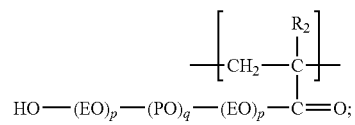

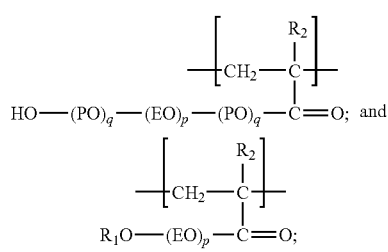

wherein
$R_1$ and $R_2$ are each independently hydrogen or alkyl of 1 to 4 carbon atoms;
EO represents $-CH_2CH_2O-$;
PO represents $-CH(CH_3)CH_2O-$;
each p is independently an integer of 1 to about 128; and
each q is independently an integer of 0 to about 55.

6. The method of claim 1, wherein the subterranean clastic formation is downhole.

7. The method of claim 1, wherein the subterranean clastic formation is predominantly sandstone.

8. The method of claim 1, wherein the hydrocarbon-bearing subterranean clastic formation comprises a well, and wherein injecting the composition into the subterranean clastic formation stimulates productivity from the well.

9. The method of claim 1, wherein after injecting the composition, the hydrocarbon-bearing subterranean clastic formation has a gas relative permeability that is at least 2 percent higher than a gas relative permeability prior to injecting the composition.

10. The method of claim 1, wherein after injecting the composition, the hydrocarbon-bearing subterranean clastic formation has a condensate relative permeability that is at least 2 percent higher than a condensate relative permeability prior to injecting the composition.

11. The method of claim 1, further comprising obtaining hydrocarbons from the hydrocarbon-bearing subterranean clastic formation, wherein the hydrocarbons comprise at least one of methane, ethane, propane, butane, hexane, heptane, or octane.

12. The method of claim 1, wherein the hydrocarbon-bearing subterranean clastic formation is a gas-bearing formation.

13. The method of claim 1, wherein the hydrocarbon-bearing subterranean clastic formation has a surface, the method further comprising contacting the surface with the composition.

14. The method of claim 1, wherein the solvent is present at least 50 percent by weight, based on the total weight of the composition.

15. The method of claim 1, wherein the solvent is a water-miscible solvent.

16. The method of claim 1, wherein the solvent comprises at least one of methanol, ethanol, propanol, isopropanol, butanol, ethylene glycol, acetone, a glycol ether, supercritical carbon dioxide, or liquid carbon dioxide.

17. A method of treating a hydrocarbon-bearing subterranean clastic formation, the method comprising injecting into the hydrocarbon-bearing subterranean clastic formation a composition made by a method comprising:
   selecting a hydrocarbon-bearing subterranean clastic formation, the formation having a temperature, water content, and ionic strength;
   determining the temperature, water content, and ionic strength of the hydrocarbon-bearing subterranean clastic formation;
   generating a formulation comprising a nonionic fluorinated polymeric surfactant and at least one of solvent or water, the formulation based at least in part on the determined temperature, water content, and ionic strength of the hydrocarbon-bearing subterranean clastic formation, wherein the nonionic fluorinated polymeric surfactant has a cloud point when placed in the hydrocarbon-bearing subterranean clastic formation that is above the temperature of the hydrocarbon-bearing subterranean clastic formation; and
   making a composition having the formulation.

18. The method of claim 17, wherein the hydrocarbon-bearing subterranean clastic formation comprises a well, and wherein injecting the composition into the subterranean clastic formation stimulates productivity from the well.

19. The method of claim 17, further comprising obtaining hydrocarbons from the hydrocarbon-bearing clastic formation, wherein the hydrocarbons comprise at least one of methane, ethane, propane, butane, hexane, heptane, or octane.

20. The method of claim 17, wherein the hydrocarbon-bearing subterranean clastic formation has a surface, the method further comprising contacting the surface with the composition.

\* \* \* \* \*